United States Patent [19]

Kahle et al.

[11] 4,356,918
[45] Nov. 2, 1982

[54] DISC STORAGE CONTAINER

[75] Inventors: Henry Kahle, Irvine; Jeffrey R. Menkes, El Toro; Dean L. Christensen, Long Beach, all of Calif.

[73] Assignee: Memorex Corporation, Santa Clara, Calif.

[21] Appl. No.: 256,101

[22] Filed: Apr. 21, 1981

[51] Int. Cl.³ .............................................. B65D 85/30
[52] U.S. Cl. ..................................... 206/444; 206/387
[58] Field of Search ............... 206/1 R, 309, 310, 311, 206/312, 307, 313, 232, 445, 472, 475, 474, 478, 444, 387; 220/23, 22.1, 315, 38; 346/137; 360/133

[56] References Cited

U.S. PATENT DOCUMENTS

| | | | |
|---|---|---|---|
| 2,261,806 | 4/1939 | Hills | 206/309 |
| 2,465,752 | 3/1948 | Rodbell | 220/23 |
| 3,265,453 | 6/1963 | Serde | 206/311 |
| 3,272,325 | 9/1966 | Martinus et al. | 206/52 |
| 3,743,374 | 7/1973 | Glass | 312/319 |
| 3,754,639 | 8/1973 | Gellert | 206/1 R |
| 3,909,088 | 9/1975 | Dennehey et al. | 312/12 |
| 3,978,985 | 9/1976 | Zinnbauer | 206/387 |
| 4,102,452 | 7/1978 | Sato et al. | 206/387 |
| 4,289,235 | 9/1981 | Egly | 206/387 |

FOREIGN PATENT DOCUMENTS 1034848 7/1966 United Kingdom .

Primary Examiner—William I. Price
Assistant Examiner—Byron Gehman
Attorney, Agent, or Firm—Limbach, Limbach & Sutton

[57] ABSTRACT pg,1 The invention described herein is a storage container adapted to hold a plurality of substantially planar flexible members, such as flexible magnetic discs. The container has a base section and a pouch section. The pouch section is adapted to be fitted into the base section in a closed position and the pouch section is adapted to rotate about an axis such that in an open position the pouch section rests against the base section. The pouch section further has a partial front wall which is adapted to pivot about an axis enlarging the pouch section greatly facilitating the insertion and removal of the flexible planar member. Finally, the storage container has detent means to provide positive closure in the closed position.

8 Claims, 4 Drawing Figures

DISC STORAGE CONTAINER

BACKGROUND OF THE INVENTION

The present invention relates to a storage container, and more particularly to a storage container that is well suited for storing planar type discs, commonly known as floppy discs.

Magnetically flexible discs have found increasing use in a variety of applications, relating to computers. The discs are planar and are flexible, hence they have acquired the name "floppy" discs. The industry has now standardized these flexible discs to the size of 8" or 5¼" in diameter. The standard packaging for the industry is 10 flexible discs per single storage unit. Most standard units are typically that of a cardboard box. Some have removable lids, and there is one type wherein the top portion of the storage unit folds back much like a cigarette box. Recently, several plastic type storage units have appeared on the market. One storage unit marketed by SRW Computer Components is a one-piece folding case with a pull out basket type insert in which the discs are set.

The drawback to all of the foregoing described storage units is that it is difficult to select the proper disc that is contained within the storage unit. Since a plurality of discs are stored in one storage unit, and since the storage unit is fixed in size and shape and is rigid in construction, the fit is snug. With a snug fit, the selection of the proper disc within a plurality of discs may subject the disc to potential damaging bending process either during the removal of the particular disc from the storage unit or the insertion of the disc within the unit. Another problem of the prior art unit is that of positive closure. Either the storage unit closes so tightly that the unit is difficult to open, or the fit of the unit is so poor that the storage unit is subject to potential contamination during storage.

Aduio cassette storage units are well-known in the art. See, for example U.S. Pat. Nos. 3,754,639; 3,272,325; 3,909,088; 3,978,985; 3,743,374; and Great Britian Pat. No. 1,034,848. These types of units, however, do not share the problems of storage units which are particularly adapted for storing a plurality of planar members, such as flexible discs; inasmuch as the storage unit for audio cassettes is adapted for storing only one unit per storage container.

SUMMARY OF THE INVENTION

Therefore, in accordance with the present invention, a storage container, which is adapted to hold a plurality of substantially planar flexible members, has a base section which comprises a pair of side walls of substantially equal length, a first end wall connected with each of the side walls at one end, and a bottom wall connected with the first end wall and the side walls. The bottom wall extends for only a portion of the length of the side walls, terminating at one end with the side walls extending freely beyond the one end of the bottom wall. The storage container has a pouch section which is adapted to hold the planar members. The pouch section has a cover wall, a second end wall, and a partial front wall. The front wall is adapted to pivot about an axis from a first position of being substantially parallel to the cover wall to a second position of enlarging the pouch section. The pouch section is adapted to pivot about an axis near the other end of the side walls from a closed position whereby the pouch is confined substantially in a region defined by the side walls, the first end wall, and the bottom wall, with the cover wall enclosing the region, to an open position whereby the pouch section rests against the base section.

DETAILED DESCRIPTION OF THE INVENTION

Figure 1:
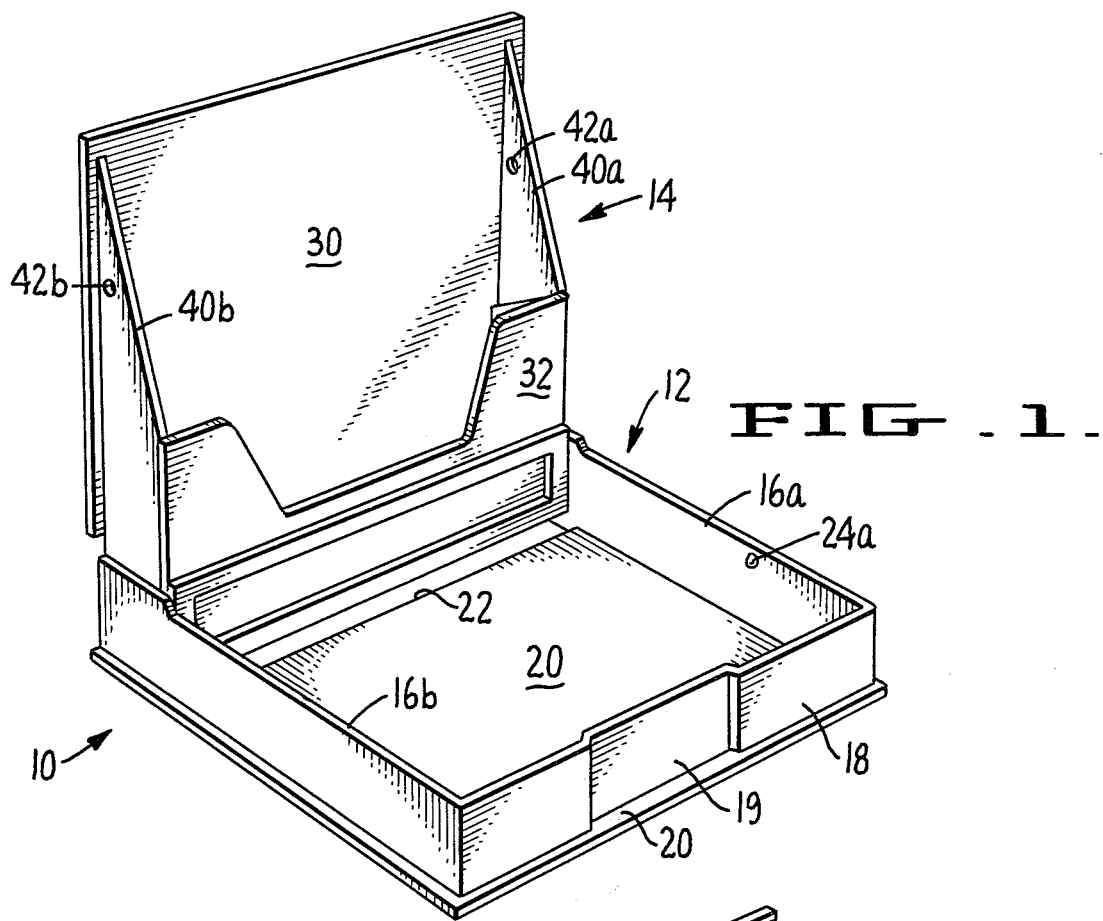
FIG. 1 is a perspective view of the storage container of the present invention.

Referring to FIG. 1, there is shown a perspective view of the storage container 10 of the present invention. The storage container 10 comprises a base section 12 and a pouch section 14. The base section 12 comprises a pair of side walls 16A, and 16B. A first end wall 18 is connected to the side walls 16A and 16B at one end thereof. A bottom wall 20 is connected with first end wall 18 and with the side walls 16A and 16B. The bottom wall 20 extends for only a portion of the length of the side walls 16A and 16B, terminating at one end 22. The side walls 16A and 16B extend freely beyond the one end 22 of the bottom wall 20. In each of the side walls 16A and 16B, a protrusion 24A and 24B (not shown) is thereon. The function of the protrusions 24A and 24B will be described hereinafter. An indentation 14 is substantially in the middle of the first end wall 18. The function of the indentation 19 will be described in detail hereinafter.

Figure 2:
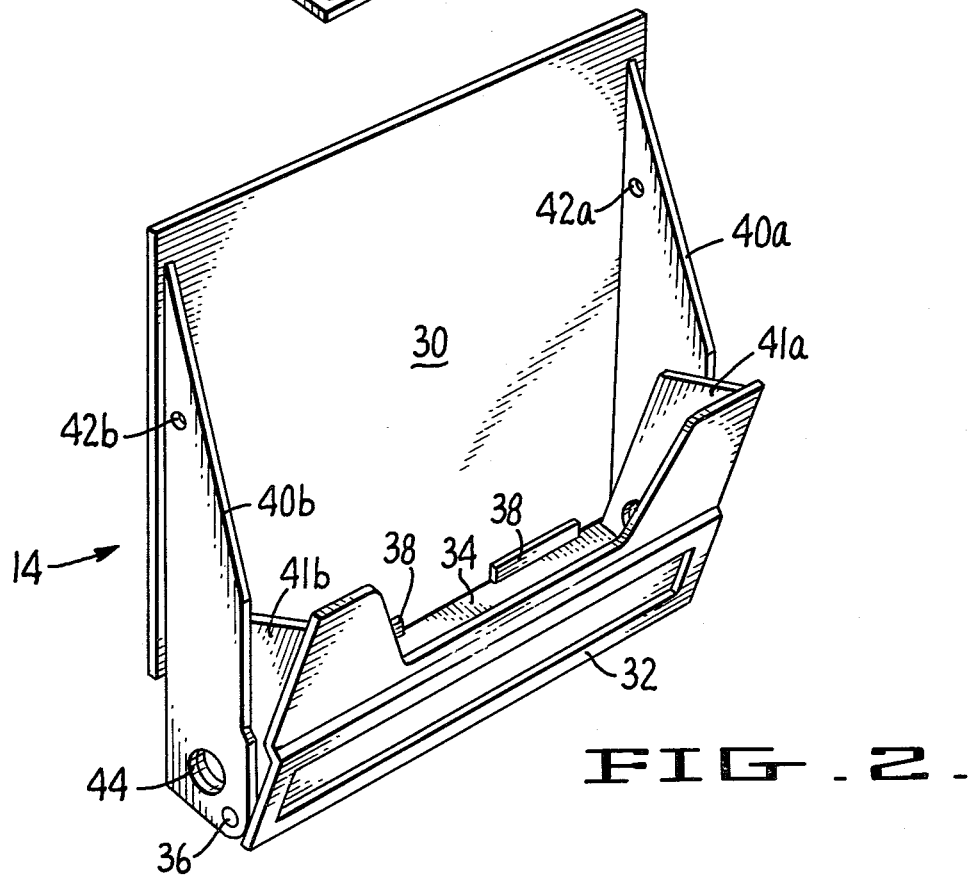
FIG. 2 is a perspective view of the pouch section of the storage container of the present invention.

Referring to FIG. 2, there is shown in greater detail a perspective view of the pouch section 14 of the storage container 10 of the present invention. The pouch section 14 comprises two portions. A first portion comprises a cover wall 30, and a pair of flange walls 40A and 40B connected to the sides of the cover wall 30. A pair of holes 42A and 42B are in the flange walls 40A and 40B with one hole within each of the flange walls 40A and 40B, respectively. The function of the holes 42A and 42B will be described hereinafter. A pair of ridges 38 are along the cover wall 30. A second portion of the pouch section 14 comprise a partial front wall 32, a second end wall 34, attached to one end of the front wall 32 and a pair of support walls 41A and 41B connected to the sides of the of the front wall 32 and to the ends of the second end wall 34. The pouch section 14, which is adapted to hold the planar members is defined by the cover wall 30, the flange walls 40A and 40B, the end wall 34 and the front wall 32. The second portion with the front wall 32 is adapted to rotate about an axis 36, which is near the second end wall 34. The movement of the second portion is from a first position of the front wall 32 being substantially parallel to the cover wall 30 to a second position of enlarging the pouch section. The ridges 38 are stop means limiting the amount of pivot of the second portion to the second position. The flange walls 40A and 40B serve to limit the amount of pivot of the second portion to the first position.

Figure 4:
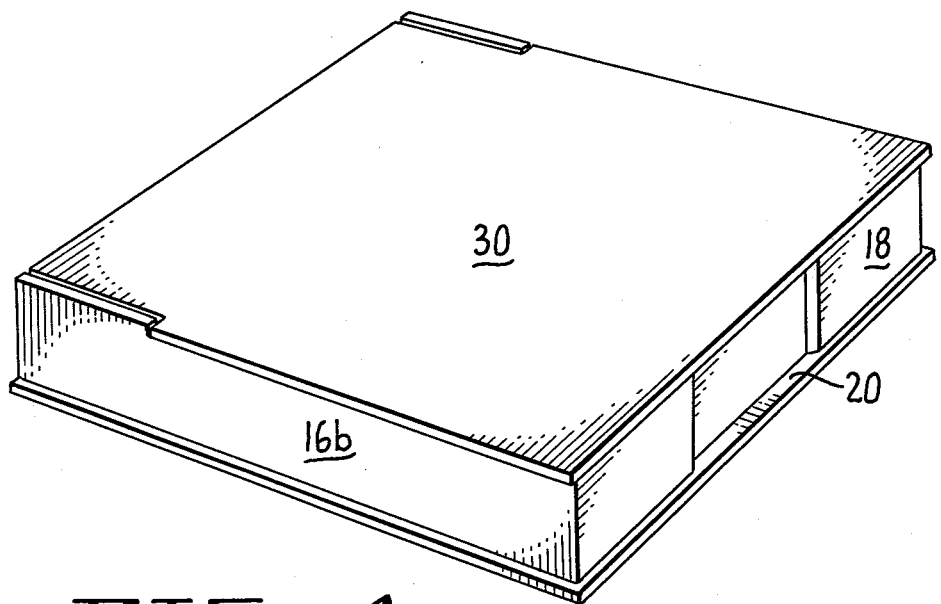
FIG. 4 is a perspective view of the storage unit of the present invention in operation in a closed position with the pouch section enclosed within the storage unit.

The pouch section 14 is adapted to pivot about an axis 44 which is near the other end of the side walls 16A and 16B. The pouch section 14 is adapted to pivot from a closed position wherein the pouch section 14 is confined substantially in a region defined by the pair of side walls 16A and 16B, the first end wall 18 and the bottom wall 20 of the base section 12 with the cover wall 30 enclosing the region. This is substantially shown in FIG. 4.

In the closed position, the protrusions 24A and 24B in the side walls 16A and 16B are aligned such that they would fit into the holes 42A and 42B, respectively, of the flange walls 40A and 40B. The fitting of the protrusion 24A to the hole 42A and of the protrusion 24B to the hole 42B forms a detent means such that the storage container 10 in a closed position has a positive closure. The indentation 19 in the first end wall 18 facilitates the opening of the storage container 10. The container 10 may be opened by grasping the cover wall 30 at the indentation 19 and prying the cover wall 30 away from the first end wall 18.

Figure 3:
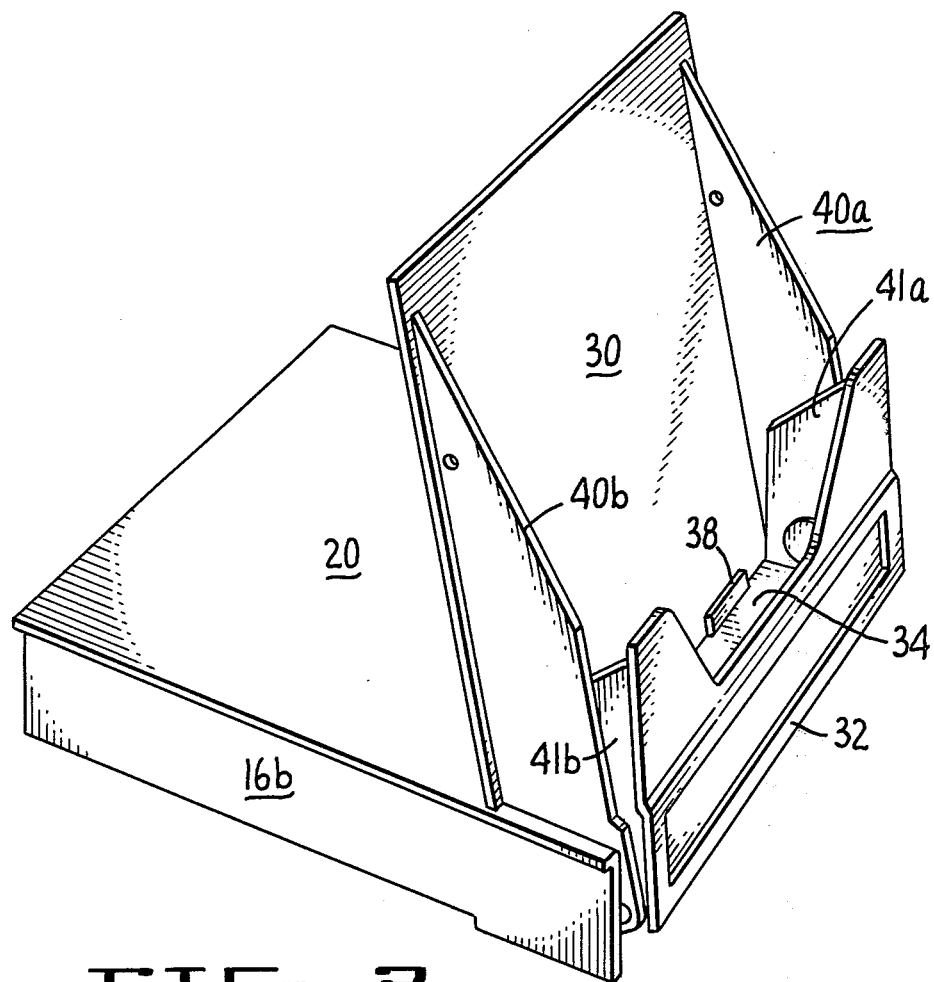
FIG. 3 is a perspective view of the storage unit of the present invention in operation, in an open position.

The pouch section 14 is also adapted to pivot about the axis 44 to a second position or an open position wherein the cover wall of the pouch section 14 rests against the one end 22 of the bottom wall 20 of the base section 12. This is shown substantially in FIG. 3. In this position, which is a rotation of substantially more than 270 degrees, the pouch section 14 rests against the base section 12 in a manner that exposes the pouch section 14. At the same time, the front wall 32 of the pouch section 14 is adapted to be pivoted about the axis 36 whereby the pouch section 14 may be enlarged to facilitate the insertion and removal of the planar flexible members.

There are many advantages of the storage container 10 of the present invention. The first and foremost is that the storage section or the pouch section 14, of the storage container 10 is not rigid in shape, but instead is flexible and may be enlarged to faciliate the insertion and the removal of the planar flexible members. This avoids the prior art problem of potentially damaging the flexible planar members by bending them in the insertion and removal process. Secondly, the detent means of the storage container 10 as provided by the protrusions 24A and 24B and the holes 42A and 42B, provide positive closure in the closed position. In addition, there is ease of manufacturing. The storage container 10 may be made out of plastic or any other suitable synthetic resin. The container 10 comprises three sections: a base section 12, and two sections that form the pouch section 14. Thus, the storage container 10 may be made with considerable ease with few parts assembled with relative ease. Each section may be made, for example, by the injection molding process. Finally, with the pouch section 14 adapted to rotate through 270 degrees to an open position whereby the pouch section 14 rests on the base section 12, the contents within the pouch section 14 is exposed and access to the flexible planar members within the pouch section 14 is greatly eased.

What is claimed is:

1. A storage container adapted to hold a plurality of substantially planar members, said container comprising:
    a base section comprising a pair of side walls of substantially equal length, a first end wall connected with each of said side walls at one end thereof, a bottom wall connected with said first end wall and said side walls, said bottom wall extending for only a portion of the length of said side walls terminating at one end, with said side walls extending freely beyond said one end of said bottom wall;
    a pouch section adapted to hold said planar flexible members, said section comprising a cover wall, a second end wall and a partial front wall;
    said front wall adapted to pivot about an axis, from a first position whereby said front wall is substantially parallel to said cover wall to a second position whereby said front wall enlarges said pouch section; and
    said pouch section adapted to pivot about an axis near said other end of said side walls from a closed position wherein said pouch is confined substantially in a region defined by said side walls, first end wall and bottom wall, with said cover wall enclosing said region, to an open position wherein said pouch section rests against said base section.

2. The container of claim 1 wherein said pouch section further comprises:
    stop means to limit the amount of pivot of said front wall to said second position.

3. The container of claim 2 wherein said stop means is on said cover wall.

4. The container of claim 3 wherein said front wall is adapted to pivot about an axis near said second end wall.

5. The container of claim 4 wherein said second end wall is attached to one end of said front wall.

6. The container of claim 5 further comprising a pair of flange walls connected to the sides of said cover wall, said flange walls serve to limit the amount of pivot of said front wall to said first position.

7. The container of claim 6 further comprising a pair of detent means in said flange walls and said side walls to hold said pouch in said closed position.

8. The container of claim 7 wherein each of said detent means comprises a protrusion in said side wall and a hole in said flange wall, with said protrusion adapted to fit into said hole, in said closed position.

* * * * *